RUDOLPH & KASEFANG.
Brush Handle.
No. 45,276. Patented Nov. 29, 1864.
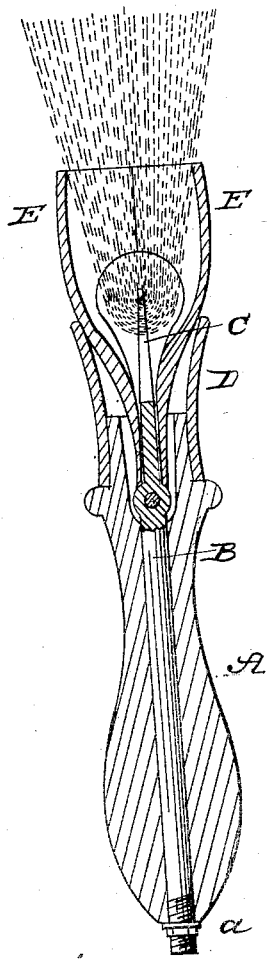
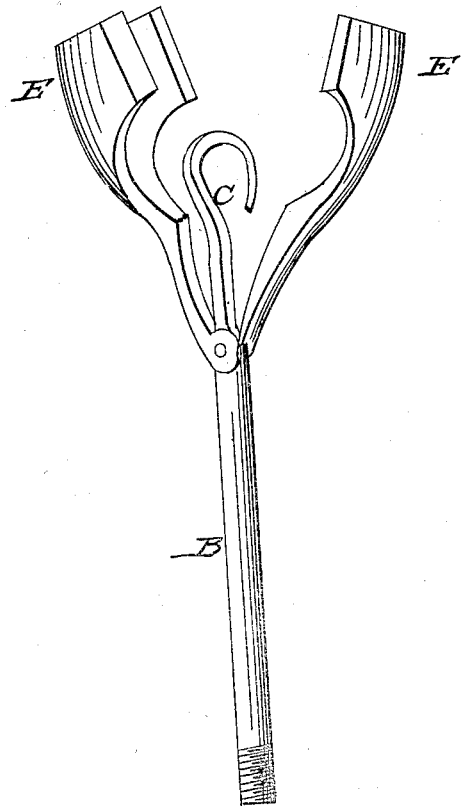
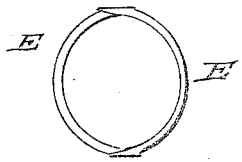

UNITED STATES PATENT OFFICE.

FRED. RUDOLPH AND WILLIAM KASEFANG, OF JERSEY CITY, NEW JERSEY.

IMPROVED BRUSH-HANDLE.

Specification forming part of Letters Patent No. 45,276, dated November 29, 1864.

*To all whom it may concern:*

Be it known that we, FRED. RUDOLPH and WILLIAM KASEFANG, of Jersey City, in the county of Hudson and State of New Jersey, have invented a new and Improved Brush-Handle; and we do hereby declare that the following is a full, clear, and exact description thereof, which will enable those skilled in the art to make and use the same, reference being had to the accompanying drawings, forming part of this specification, in which—

Figure 1 represents a longitudinal central section of this invention. Fig. 2 is a perspective view of the hinged clamp, detached and open. Fig. 3 is a plan or top view of the same.

Similar letters of reference indicate corresponding parts.

This invention relates to an improvement in wire brushes, such as are generally used for cleaning off castings. These brushes are generally made by tying a number of wires together until a bunch is obtained of sufficient thickness for a brush. One end of this bunch forms the handle, and the other end, in which all the wires are left open and not fastened together, forms the brush. A brush of this kind can be used until it is worn down to the handle, but that portion of the wire which forms the handle is mere waste, and large quantities of wire are thus wasted and thrown away as useless. To obviate this waste, which, particularly with the present high price of wire, is of considerable account, is the object of our invention, which consists in the employment, for the purpose of holding a wire brush, of a hook or loop projecting from a shank, which is secured in a suitable handle and to which two jaws are hinged in such a manner that when the shank is taken out of the handle and the jaws are opened, the wire which is intended for the brush can be readily wound round the hook or loop, and when the shank is introduced into the handle the jaws, by coming in contact with the edge of the ferrule, are closed and the wire is firmly and securely confined, and a brush is obtained which can be used up to within a short distance from the hook or loop.

A represents a handle, turned of wood or any other suitable material, in the usual form and manner. This handle is bored out in a longitudinal direction to receive the shank B of the hook or loop C. A nut, *a*, serves to draw this shank and hook down into the handle, and when the hook is secured in its place it projects slightly above the top edge of the ferrule D, which is secured to the end of the handle A. This ferrule projects somewhat above the end of the handle and its edge is turned out, as clearly shown in Fig. 1 of the drawings.

E E are two jaws which are hinged to the shank B by means of a pivot, *b*. These jaws are curved, as clearly shown in the drawings, and when closed up they form a complete circle, as shown in Fig. 3, in which the brush is confined. The wire which is intended for the brush is wound round the hook or loop C, as shown in red outlines in Fig. 1 of the drawings, and if a sufficient quantity has thus been secured to the hook the shank B is introduced into the handle and pushed down. The jaws E E, on coming in contact with the edge of the ferrule, close up tight round the wire, and, by securing the shank by means of the nut *a*, the brush is firmly confined between the jaws and it can be used until it wears clear down to the edge of the jaws E. The quantity of wire thus wasted is trifling in comparison with the large quantity which has to be thrown away if the wire itself has to form the handle. Our handle can be made cheap, it facilitates the operation of making the brushes, and it gives a better hold than a handle of the ordinary construction.

I claim as new and desire to secure by Letters Patent—

The hoop or loop C, projecting from a shank, B, in combination with hinged jaws E E and handle A, constructed and operating substantially as and for the purpose set forth.

FRED. RUDOLPH.
WILLIAM KASEFANG.

Witnesses:
 THEO. TUSCH,
 WM. F. MCNAMARA.